US007929805B2

(12) United States Patent
Wang et al.

(10) Patent No.: US 7,929,805 B2
(45) Date of Patent: Apr. 19, 2011

(54) IMAGE-BASED CAPTCHA GENERATION SYSTEM

(75) Inventors: James Z. Wang, State College, PA (US); Ritendra Datta, State College, PA (US); Jia Li, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 1104 days.

(21) Appl. No.: 11/668,853

(22) Filed: Jan. 30, 2007

(65) Prior Publication Data

US 2007/0201745 A1 Aug. 30, 2007

Related U.S. Application Data

(60) Provisional application No. 60/763,811, filed on Jan. 31, 2006.

(51) Int. Cl.
G06K 9/32 (2006.01)
(52) U.S. Cl. ............................ 382/298; 382/305; 726/21
(58) Field of Classification Search .................. 382/298, 382/305; 726/21
See application file for complete search history.

(56) References Cited

U.S. PATENT DOCUMENTS

| 6,195,698 | B1 * | 2/2001 | Lillibridge et al. | 709/225 |
|---|---|---|---|---|
| 7,139,916 | B2 * | 11/2006 | Billingsley et al. | 713/182 |
| 7,430,720 | B2 * | 9/2008 | Hua et al. | 715/753 |
| 7,577,994 | B1 * | 8/2009 | Sobel et al. | 726/22 |
| 7,725,395 | B2 * | 5/2010 | Rui et al. | 705/50 |
| 7,841,940 | B2 * | 11/2010 | Bronstein | 463/29 |
| 2003/0204569 | A1 * | 10/2003 | Andrews et al. | 709/206 |
| 2005/0065802 | A1 * | 3/2005 | Rui et al. | 705/1 |
| 2005/0144067 | A1 * | 6/2005 | Farahat et al. | 705/14 |
| 2005/0193208 | A1 * | 9/2005 | Charrette et al. | 713/182 |
| 2005/0198580 | A1 * | 9/2005 | Hua et al. | 715/753 |
| 2005/0229251 | A1 * | 10/2005 | Chellapilla et al. | 726/23 |
| 2007/0143624 | A1 * | 6/2007 | Steeves | 713/182 |

OTHER PUBLICATIONS

Recognizing objects in adversarial clutter—CAPTCHA, Mori et al,IEEE 1063-6919 , 2003 pp. 1-8.*
Telling Humans and computer apart, Luis et al, ACM, 0002-0782/04/0200, vol. 47 No. 2, pp. 56-60.*
Recognognizing Objects—CAPTCHA, Mori et al., IEEE, 1063-6919, 2003, pp. 1-8.*
Imagination:—CAPTCHA generation system, ACM, Nov. 6-11, 2005, 59593-044-2/05/0011, pp. 331-334.*
Telling Humans and Computer apart, Luis et al, ACM, 0002-0782/A04./2000, vol. 47 No. 2, pp. 57-60.*

(Continued)

*Primary Examiner* — Samir A Ahmed
*Assistant Examiner* — Jayesh Patel
(74) *Attorney, Agent, or Firm* — Gifford, Krass, Sprinkle, Anderson & Citkowski, P.C.

(57) ABSTRACT

In a system and method for the generation of attack-resistant, user-friendly, image-based CAPTCHAs (Completely Automated Public test to Tell Computers and Humans Apart), controlled distortions are applied to randomly chosen images and presented to a user for annotation from a given list of words. An image is presented that contains multiple connected but independent images with the borders between them distorted or otherwise visually obfuscated in a way that a computer cannot distinguish the borders and a user selects near the center of one of the images. The distortions are performed in a way that satisfies the incongruous requirements of low perceptual degradation and high resistance to attack by content-based image retrieval systems. Word choices are carefully generated to avoid ambiguity as well as to avoid attacks based on the choices themselves.

15 Claims, 4 Drawing Sheets

OTHER PUBLICATIONS

Recgonizing Objects—CAPTCHA, Mori et al, IEEE, 1063-6919/03,2003, pp. 1-8.*
Imagination—CAPTCHA generation system, ACM,Nov. 6-11, 2005,1-59593-044-2/05/0011, pp. 331-334.*
Distortion Estimation-CAPTCHAs, Moy et al, IEEE, 1063-6919/04,2004, pp. 1-6.*
Is it Human or Computer—CAPTCHAS, Pope et al,IEEE, 1520-9202/05, 2005, pp. 43-49.*
Image recognition CAPTCHAs, Chew et al, University of california, 102592-01-Z-0236, pp. 1-19.*
Arnold W.M. Smeulders, Marcel Worring, Simone Santini, Amarnath Gupta, Ramesh Jain, "Content-Based Image Retrieval at the End of the Early Years," IEEE Transactions on Pattern Analysis and Machine Intelligence, vol. 22, No. 12, Dec. 2000, pp. 1349-1380.
Ritendra Datta, Jia Li, James Z. Wang, "Imagination: A Robust Image-based CAPTCHA Generation System," Proceedings of the ACM Multimedia Conference, Singapore, ACM, Nov. 2005.
Luis von Ahn, Manuel Blum, John Langford, "Telling Humans and Computers Apart (Automatically) or How Lazy Cryptographers do AI," Communications of the ACM, Feb. 2004/vol. 47, No. 2, pp. 57-60.
Monica Chew, J.D. Tygar, "Image Recognition CAPTCHAs," Report No. UCB/CSD-04-1333, USPS 102592-01-Z-0236, Jun. 10, 2004, Computer Science Division, University of California, Berkeley, California 94720.
Jay J. Jiang, David W. Conrath, "Semantic Similarity Based on Corpus Statistics and Lexical Taxonomy," In Proceedings of International Conference Research on Computational Linguistics (ROLCLING X), 1997, Taiwan.
George A. Miller, "WordNet: A Lexical Database for English," Communications of the ACM, Nov. 1995/vol. 38, No. 11, pp. 39-41.
William G. Morein, Angelos Stavrou, Debra L. Cook, Angelos D. Keromytis, Vishal Misra, Dan Rubenstein, "Using Graphic Turing Tests to Counter Automated DDoS Attacks Against Web Servers," Proceedings of the 10th ACM Conference on Computer and Communications Security, Washington, DC, pp. 8-19, 2003.
Greg Mori, Jitendra Malik, "Recognizing Objects in Adversarial Clutter: Breaking a Visual CAPTCHA," 2003 IEEE Computer Society Conference on Computer Vision and Pattern Recognition, Jun. 2003, vol. 1, pp. 1-134-1-141.
Yong Rui, Zicheng Liu, "Artifacal: Automated Reverse Turing Test Using Facial Features," Microsoft Research Technical Report No. MSR-TR-2003-48, Apr. 15, 2003.
Jia Li, James Ze Wang, Gio Wiederhold, "SIMPLicity: Semantics-sensitive Integrated Matching," IEEE Transactions on Pattern Analysis and Machine Intelligence, vol. 23, No. 9, Sep. 2001, pp. 947-963.

* cited by examiner

IMAGE-BASED CAPTCHA GENERATION SYSTEM

REFERENCE TO RELATED APPLICATION

This application claims priority from U.S. Provisional Patent Application Ser. No. 60/763,811, filed Jan. 31, 2006, the entire content of which is incorporated herein by reference.

GOVERNMENT SPONSORSHIP

The subject invention was made with United States government support under a grant from the National Science Foundation, Grant No. IIS-0347148. Accordingly, the United States government has certain Tights in the invention.

FIELD OF THE INVENTION

This invention relates generally to CAPTCHAs and, in particular, to the generation of attack-resistant, user-friendly, image-based CAPTCHAs.

BACKGROUND OF THE INVENTION

A way to tell apart a human from a computer by a test is known as a Turing Test [10]. When a computer program is able to generate such tests and evaluate the result, it is known as a CAPTCHA (Completely Automated Public test to Tell Computers and Humans Apart) [1]. In the past, Websites have often been attacked by malicious programs that register for service on massive scale. Programs can be written to automatically consume large amount of Web resources or bias results in on-line voting. This has driven researchers to the idea of CAPTCHA-based security, to ensure that such attacks are not possible without human intervention, which in turn makes them ineffective. CAPTCHA-based security protocols have also been proposed for related issues, e.g., countering Distributed Denial-of-Service (DDoS) attacks on Web servers [6].

A CAPTCHA acts as a security mechanism by requiring a correct answer to a question which only a human can answer any better than a random guess. Humans have speed limitation and hence cannot replicate the impact of an automated program. Thus the basic requirement of a CAPTCHA is that computer programs must be slower than humans in responding correctly. To that purpose, the semantic gap [9] between human understanding and the current level of machine intelligence can be exploited. Most current CAPTCHAs are text-based.

Commercial text-based CAPTCHAs have been broken using object-recognition techniques [7], with accuracies of up to 99 percent on EZ-Gimpy. This reduces the reliability of security protocols based on text-based CAPTCHAs. There have been attempts to make these systems harder to break by systematically adding noise and distortion, but that often makes them hard for humans to decipher as well. Image-based CAPTCHAs have been proposed as alternatives to the text media [1, 3, 8]. State-of-the-art content-based image retrieval (CBIR) and annotation techniques have shown great promise at automatically finding semantically similar images or naming them, both of which allow means of attacking image-based CAPTCHAs. User-friendliness of the systems are potentially compromised when repeated responses are required [3] or deformed face images are shown [8].

One solution is to randomly distort the images before presenting them. However, current image matching techniques are robust to various kinds of distortions, and hence a systematic distortion is required. In summary, more robust and user-friendly systems can be developed.

SUMMARY OF THE INVENTION

This invention resides in a system for the generation of attack-resistant, user-friendly, image-based CAPTCHAs. In our system, called IMAGINATION IMAge Generation for Internet AuthenticaTION), we produce controlled distortions on randomly chosen images and present them to the user for annotation from a given list of words. An image is presented that contains multiple connected but independent images with the borders between them distorted or otherwise visually obfuscated in a way that a computer cannot distinguish the borders and a user selects near the center of one of the images.

The distortions are performed in a way that satisfies the incongruous requirements of low perceptual degradation and high resistance to attack by content-based image retrieval systems. Word choices are carefully generated to avoid ambiguity as well as to avoid attacks based on the choices themselves. Preliminary results demonstrate the attack-resistance and user-friendliness of our system compared to text-based CAPTCHAs.

DETAILED DESCRIPTION OF THE INVENTION

Given a database of images of simple concepts, a two-step user-interface allows quick testing for humans while being expensive for machines. Controlled composite distortions on the images maintain visual clarity for recognition by humans while making the same difficult for automated systems.

Requiring the user to type in the annotation may lead to problems like misspelling and polysemy [3]. In our system, we present to the user a set of word choices, and the user must choose the most suitable image descriptor. A problem with generating word choices is that we might end up with, for example, the word "dog" and the word "wolf" in the list, and this may cause ambiguity in labeling. To avoid this problem, we propose a WordNet-based [5] algorithm to generate a semantically non-overlapping set of word choices while preventing odd-one-out attacks using the choices themselves. Because the number of choices are limited, the location of the mouse-click on the composite image acts as additional user input, and together with the annotation, it forms the two-step mechanism to reduce the rate of random attacks. A reason for naming our system IMAGINATION is that it aims to exploit human imagination power gained through exposure/experience, allowing interpretation of pictures amidst distortion/clutter.

Figure 1:
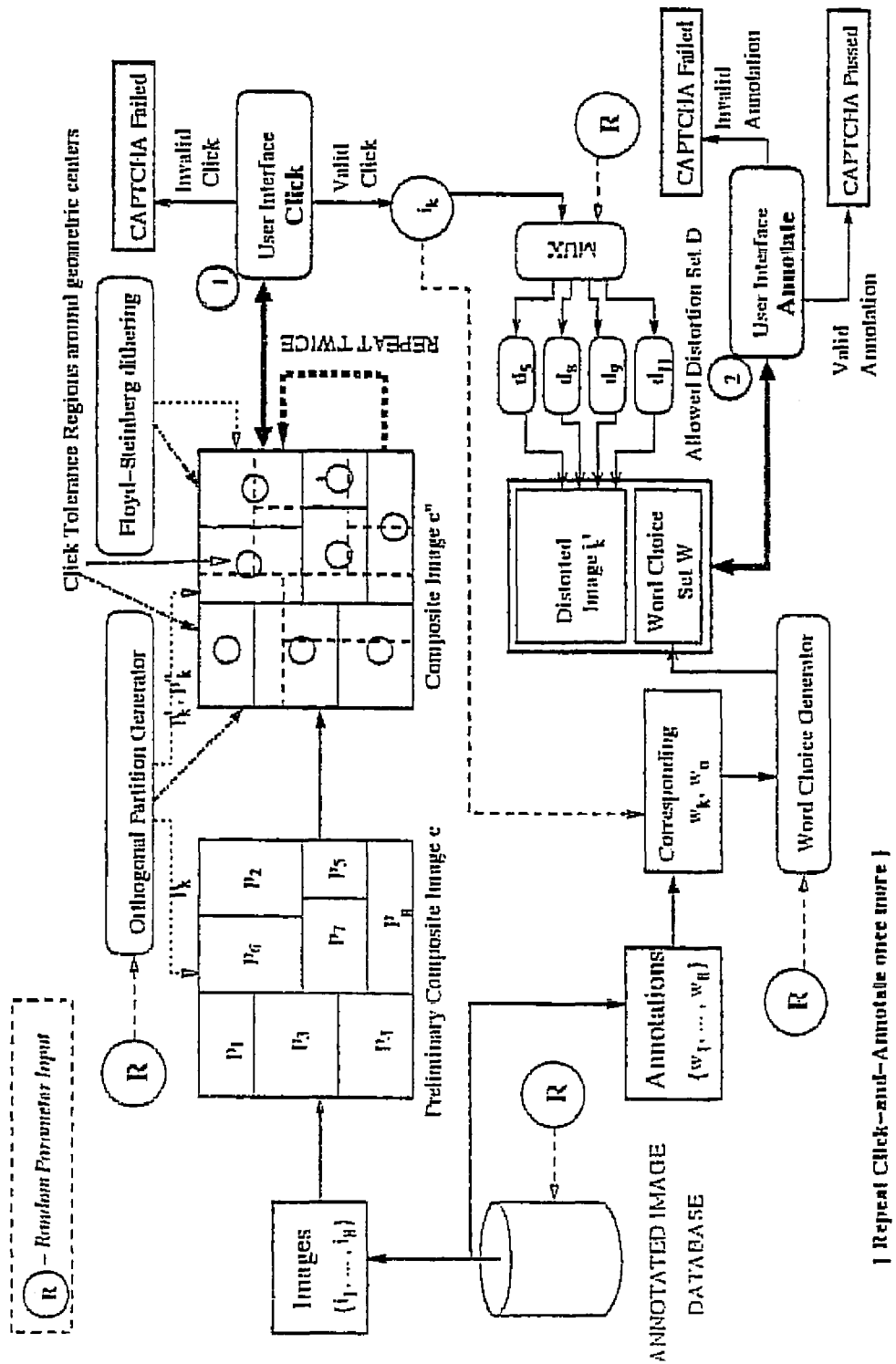
FIG. 1 is a diagram that depicts an architecture according to the present invention.

The overall system architecture is shown in FIG. 1. We have a two-round click-and-annotate process in which a user needs to click on the interface 4 times in all. The system presents the user with a set of 8 images tiled to form a single composite image. The user must then select an image she wants to annotate by clicking near its geometric center. If the location of the click is near one of the centers, a controlled distortion is performed on the selected image and displayed along with a set of word choices pertaining to it, and the user must choose the appropriate one. If the click is not near any of the centers or the choice is invalid, the test restarts. Otherwise, this click-and-annotate process is repeated one more time, passing which the CAPTCHA is considered cleared. The reason for having the click phase is that the word choices are limited, making random attack rate fairly high. Instead of having numerous rounds of annotate, user clicks tend to make the system more user-friendly, while decreasing the attack rate.

The first step is the composite image generation. Given an annotated database of images I consisting of simple concepts and objects, the system randomly selects a set of 8 images $\{i_1, \ldots, i_8\}$ with their corresponding annotations $\{w_1, \ldots, w_8\}$. A rectangular region is divided into 8 random orthogonal partitions $\{p_1, \ldots, p_8\}$ and by a one-to-one mapping $i_k \rightarrow p_k$, each image is placed into a partition, scaled as necessary, forming a preliminary composite image c. A two-stage dithering using the Floyd-Steinberg error-diffusion algorithm is then performed. The image c is randomly divided into two different sets of 8 orthogonal partitions $\{p'_1, \ldots, p'_8\}$ and $\{p''_1, \ldots, p''_8\}$, and dithering is applied on these two sets sequentially, forming the required composite image c". Dithering parameters that are varied independently over each partition include the base colors used (18, randomly chosen in RGB space), resulting in different color gamuts, and the coefficients used for spreading the quantization error. The same ratio of coefficients 7/16, 1/16, 5/16 and 3/16 is used for neighboring pixels, but they are multiplied by a factor αk, which is chosen randomly in the range of 0.5-1.5. These steps ensure that the task of automatically determining the geometric centers of the images remain challenging, while human imagination continues to steer rough identification.

Figure 2:
FIG. 2 shows a sample image that is generated by the IMAGINATION system.

The difficulty in automated detection arises from the fact that partitioning and subsequent dithering cuts the original image tiling arbitrarily, making techniques such as edge/rectangle detection generate many false boundaries (see example in FIG. 2 for an idea). Let the location of the actual user click be (X, Y). Suppose the corner coordinates of the 8 images within the composite image be $$\{(x_1^k, y_1^k, x_2^k, y_2^k), k = 1, \ldots 8\}.$$

The user's click is considered valid if $$\min_k \left\{ \left( X - \frac{x_1^k + x_2^k}{2} \right) + \left( Y - \frac{x_1^k + x_2^k}{2} \right) \right\} \leq R^2$$

where tolerance R is a constant determining the radius around the actual geometric centers of each image up to which this validity holds. Note that this parameter adjusts the wall between user-friendliness and reliability (larger tolerance R also means higher random attack rate).

Suppose the response is valid and the minimum is achieved for image $i_k$. Then a randomly chosen composite distortion from among an allowed distortion set D is performed on ik and displayed in its original size and aspect ratio. Based on the corresponding annotation $w_k$, a word choice set W is generated. Generation of D and W are described below.

Determining the Allowed Distortion Set

Images can be distorted in various ways. Our design of an allowed distortion set D requires the inclusion of distortions that maintain good visual clarity for recognition by humans while making automated recognition hard. CAPTCHA requires that the annotated database and relevant code be publicly available, for added security. If undistorted images from the database were presented as CAPTCHAs, attacks would be trivial. Previous systems proposed [3] are liable to such attacks. If the images are randomly distorted before being presented to the user [1], it may still be possible to perform attacks using computer vision techniques such as affine/scale invariant features and CBIR.

We aim at building image-based CAPTCHAs secure against such attacks. Certain assumptions about possible attack strategies are needed in order to design attack-resistant distortions. Here, we assume that the only feasible way is to use CBIR (content-based image retrieval) to perform inexact matches between the distorted image and the set of images in the database, and use the label associated with an appropriately matched one for attack. This assumption is reasonable since attack strategy needs to work on the entire image database in real-time in order to be effective, and image retrieval usually scales better than other techniques.

Suppose $d(i_k)$ indicates the application of distortion d on image $i_k$, and $Sp(i_j, i_k)$ denotes the similarity measure between images $i_j$ and $i_k$ using image retrieval system $S_p$. Considering the worst-case scenario where the attacker has access to the database I, the CBIR system $S_p$, and the distortion algorithms in D, a good attack strategy can be as follows: The attacker studies the distribution of the distances between (1) a distorted image and its original, $f_1(\chi)$, and (2) a distorted image and all other images in I, $f_2(\chi)$. For a given distorted image $d(i_j)$, she can then compute $Sp(d(i), i_k) \forall i_k \in I$. If there are significant differences between $f_1(\chi)$ and $f_2(\chi)$, the attacker can exploit this to eliminate images in I that are unlikely to be $i_j$. One way to do this is to set a confidence interval [a, b] at say 90% level around the mean of distribution f1 and then eliminating all images $i_k$ except those with $a \leq S_p(d(i_j), i_k) \leq b$. With N images contained in I, and a random guess, $P(Attack)=N^{-1}$, while after elimination, $$P(\text{Attack}) = \left( 0.9N \int_a^b f_2(x) dx \right).$$

Figure 3:
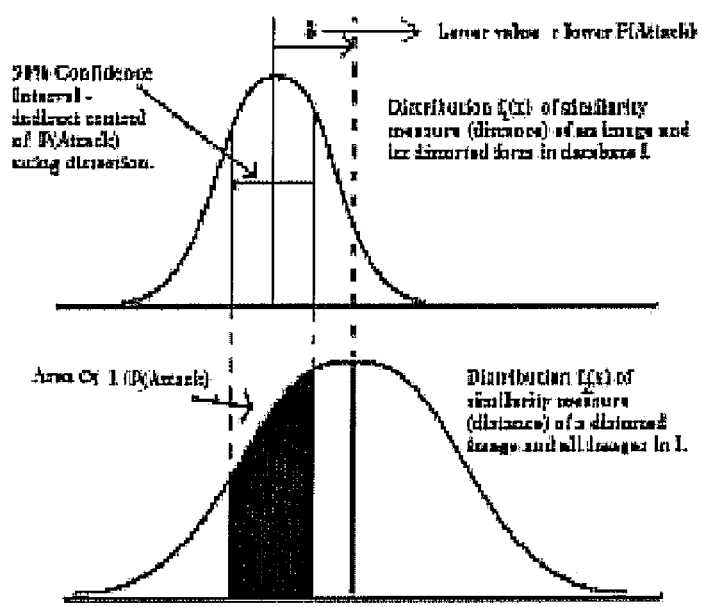
FIG. 3 is a set of graphs that shows how effective the distortions can be to automatic attacks by automated systems.

This idea is illustrated in FIG. 3. Our goal is to counter such attacks by choosing distortions d that minimize P(Attack), i.e. maximize $$\int_a^b f_2(x) dx.$$

Although $f_2(\chi)$ is dependent on $d(i_j)$, there is no easy way to control $f_2$ directly through a choice of d. Instead, we design D by choosing distortions d that give a value for P(Attack) below a chosen threshold T. In this way, we ensure that probabilistically, given distorted image $d(i_j)$ and all data/code, the attacker can identify the original image i, in I (and hence successfully attack) with a probability of at most T. We found through experiments that while $f_2(\chi)$ tends to be a wider distribution, $f_1(\chi)$ is usually a narrow band with mean closer to the origin, and both are only slightly skewed from Gaussian distributions. Intuitively, under such circumstances, if $\delta=|\bar{f}_1-\bar{f}_2|$, P(Attack) decreases as $\delta \to 0$ (see FIG. 3). One underlying assumption for our probabilistic criteria is that distributions $f_1(\chi)$ and $f_2(\chi)$ are invariant to the choice of $i_j$. Though this does not hold precisely, it does so for a majority of the $i_j$ in I, allowing us the liberty to make the assumption to get a significantly simpler criteria.

For experiments, our choice of $S_p$ is a state-of-the-art similarity measure (or image distance), the Integrated Region Matching (IRM) used in the SIMPLIcity system [11]. While other image comparison methods exist [9], IRM produces relatively fast (speed of attack is critical here) and accurate inexact matches. Note that the actual features or systems to be used by the attacker is unknown, but for the purpose of launching effective attacks, alternate choices seem unlikely. If there are better ways to attack the system, then these in turn improve the state-of-the-art in retrieving distorted images, and new sets of distortions need to be included in D. We have not considered attacks based on interest points or other such features.

Figure 4:
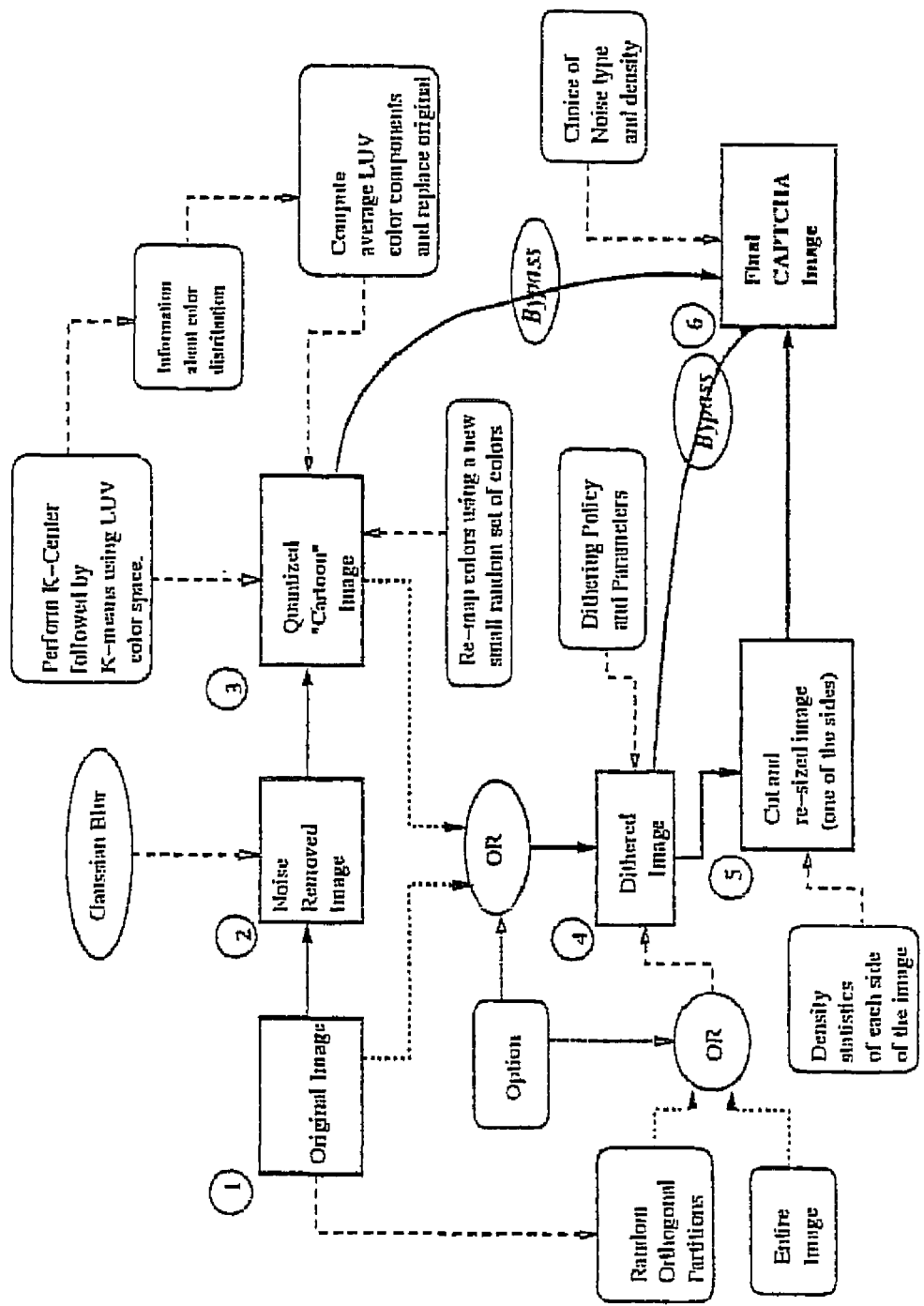
FIG. 4 is a framework for generating candidate composite distortions.

Our experiments revealed that isolated distortions are insufficient in fooling the retrieval systems. Considering attack chances and visual clarity after distortion, we came up with a set of 11 candidate composite distortions $\{d_1, \ldots, d_{11}\}$ along the framework shown in FIG. 4. Each one is composed of a combination of dithering, partitioning, quantization, noise addition, color re-mapping, and selective cut-and-resize. Dithering seemed particularly suitable since clarity was retained while low-level feature extraction (and thus image matching) was affected. We applied the distortions to 300 Corel images and used IRM to calculate $f_1(\chi)$ and $f_2(\chi)$ for each $d_k$. Based on our criteria, a suitable threshold T, and a 90% confidence interval around f1, distortions $d_5$, $d_8$, $d_9$ and $d_{11}$ were chosen as part of the allowed distortion set D. Note that we define here a formal procedure for choosing composite distortions, and select 4 acceptable ones out of a set of 11 ad-hoc distortions. Details of these distortions are not critical to the invention, since other distortions can be added to D by this procedure.

Determining the Word Choice Set

For word choice generation, factors related to image-based CAPTCHAs that have not been previously addressed are (1) it may be possible to remove ambiguity in labeling images (hence making annotation easier for humans) by the choices themselves, (2) the images might seem to have multiple valid labels (e.g. a tiger in a lake can be seen as "tiger" and "lake" as separate entities), and this may cause ambiguity, and (3) the choices themselves may result in odd-one-out attacks if the correct choice is semantically different from all others. We propose an algorithm to generate the word choice set W containing unambiguous choices for the ease of users, while ensuring that word-based attacks are ineffective. For this we use a WordNet-based [5] semantic word similarity measure [4], denoted by $d(w_1,w_2)$ where $w_1$ and $w_2$ are English words. Given the correct annotation wk (e.g. "tiger") of image $i_k$, and optionally, other words $W_0$ (e.g. {"lake"}) with the requirement of $N_w$ choices, the algorithm for determining W is as follows:

1. Set $W \leftarrow \{w_k\}+W_0, t \leftarrow 1$.
2. Choose a word $w_1 \notin W$ randomly from the database.
3. flag=0.
4. For each word $w_l \in W$
   if $d(w_k,w_l)<\theta$ then flag=1.
5. If flag=1 then go to step 2.
6. $W \leftarrow W+\{w_1\}; t \leftarrow t+1$
7. If $t<N_w$ then go to step 2.
8. $W \leftarrow W-W_0$ The value of $\theta$ depends on what range of values the word similarity measure yields and can be determined empirically or based on user surveys (i.e. what values of $\theta$ causes ambiguity). Geometrically speaking, this method yields word choices like as if all the words lie beyond the boundaries of a $(N_w)$-dimensional simplex or hyper-tetrahedron.

Results and Conclusion

Figure 5:
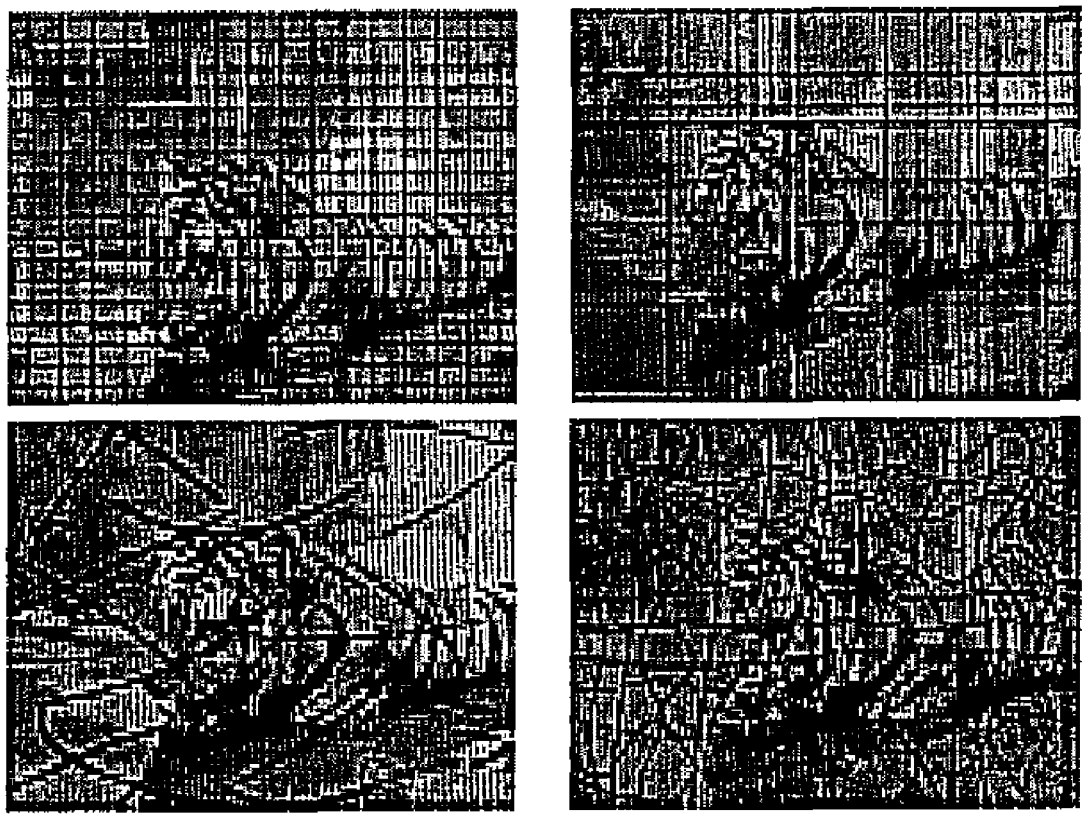
FIG. 5 shows distorted images produced using different inventive methods.

Distorted images produced using the 4 chosen methods in D are shown in FIG. 5. Clearly, perceptual quality of the images have not deteriorated beyond recognition. User-friendliness of image-based CAPTCHAs has been studied before [3]. Hence we conducted a user survey only on the ease of use of our click-and-annotate process. We chose 8 distorted images each of 8 different concepts from the Corel database, and arbitrarily chose 5 users and asked them to annotate the images (40 responses per concept). On an average, 95 percent were correct responses. Another survey was conducted on the ease of clicking near geometric centers in our composite images, using an 800×600 composite image consisting of 8 images (R=15), yielding 90 percent accuracy in user clicks.

An appropriate choice of threshold T in choosing distortion set D ensures that automated annotation is not noticeably better than a random guess among the Nw possible word choices. With Nw=15, the random attack success rate for two rounds of click-and-annotate is thus $$\left(\frac{8\pi R^2}{800\times 600} \times \frac{1}{N_w}\right)^2,$$

or 0.000062 percent. This is significantly lower than the attack rates of up to 99 percent on current text-based CAPTCHAs. Without the click phase, attack rate would still be pretty high at $1/N_w^2$ or 0.44 percent, which justifies the need for the click phase. Because cracking our proposed system will require solving two distinct hard AI problems, with our design being aimed at ensuring attack-resistance to state-of-the-art image matching, we do not expect this CAPTCHA to be broken to any sizable extent in the near future, unless there is considerable progress in image understanding technology. Our system generates distortions in less than 1 sec. on a 450 MHz Sun Ultra 60 Server. Word choice set takes about 20 sec. to generate using a Perl interface to WordNet (the algorithm makes iterative calls to the word similarity interface, which is slow), but that can be sped up easily using pre-processing.

In conclusion, we have invented a new CAPTCHAs generation system using a considerable amount of pseudo-randomness. A novel word-choice generation algorithm is proposed that tackles issues related to user-friendliness and security. A formal method for choosing composite distortion for inclusion in the allowed distortions set is proposed, and four such distortions are obtained through experimentation. Under certain assumptions about the best possible feasible attack strategy, our system is much more secure compared to text-based CAPTCHAs. User-friendliness has been carefully considered in our design, and preliminary results suggest that a simple interface and just four mouse-clicks make it favorable. Greater attack-resistance is possible by considering other possible attack strategies such as interest points, scale/affine invariants, and other object-recognition techniques.

REFERENCES

[1] L. von Ahn et al., "Telling Humans and Computers Apart (Automatically) or How Lazy Cryptographers do AI," Comm. Of the ACM, 47(2):57-60, 2004.

[2] "The CAPTCHA Project," http://www.captcha.net.

[3] M. Chew et al., "Image Recognition CAPTCHAs," Proc. 7$^{th}$ Info. Security Conf., 2004.

[4] J. J. Jiang et al., "Semantic Similarity Based on Corpus Statistics and Lexical Taxonomy," Proc. Intl. Conf. Research in Computational Linguistics, 1997.

[5] G. Miller, "WordNet: A Lexical Database for English," Comm. Of the ACM, 38(11):39-41, 1995.

[6] W. G. Morein et al., "Using Graphic Turing Tests To Counter Automated DDoS Attacks Against WebServers," Proc. ACM Conf. Computer and Comm. Security, 2003.

[7] G. Mon et al., "Recognizing Objects in Adversarial Clutter: Breaking a Visual CAPTCHA," Proc. IEEE Conf. Computer Vision and Pattern Recognition, 2003.

[8] Y. Rui et al., "ARTiFACIAL: Automated Reverse Turing Test using FACIAL features," Multimedia Systems, 9(6): 493-502, 2004.

[9] A. W. M. Smeulders et al., "Content-Based Image Retrieval at the End of the Early Years," IEEE Trans. Pattern Analysis and Machine Intelli., 22(12):1349-1380, 2000.

[10] A. Turing, "Computing Machinery and Intelligence," Mind, 59(236):433-460, 1950.

[11] J. Z. Wang et al., "SIMPLIcity: Semantics-Sensitive Integrated Matching for Picture Libraries," IEEE Trans. Pattern Analysis and Machine Intelli., 23(9):947-963, 2001

We claim:

1. A method of generating a Completely Automated Public test to Tell Computers and Humans Apart (CAPTCHA), comprising the steps of:
    storing a database of images and annotations corresponding to the images, each image depicting a concept or object intended for human recognition;
    distorting at least one of the images, and presenting the distorted image on a computer display along with a separate list of words, one of which best annotates the distorted image; and assuming that the user of the computer is a human as opposed to a machine if the correct word is selected to annotate the distorted image.

2. The method of claim 1, wherein the image is distorted using one or more of the following:
    dithering, partitioning, quantization, noise addition, color re-mapping, and selective cut-and-resize.

3. The method of claim 1, further including the steps of:
    displaying a plurality of different images prior to the step of displaying a distorted image to be annotated;
    selecting one of the images from the plurality; and
    displaying the distorted image and the separate list of words, one of which best annotates the selected image.

4. The method of claim 3,
    wherein the plurality of images are separated by borders which are distorted or otherwise visually obfuscated.

5. The method of claim 1, wherein the words are generated to avoid ambiguity with respect to the selected image.

6. A method of generating a Completely Automated Public test to Tell Computers and Humans Apart (CAPTCHA), comprising the steps of:
    storing a database of images and annotations corresponding to the images, each image depicting a concept or object intended for human recognition;
    presenting a composite image on a computer display, the composite image including plurality of different images randomly selected from the database;
    selecting one of the images from the composite image;
    distorting the selected image and presenting the distorted image along with a separate list of words, one of which best annotates the distorted image; and
    assuming that the recipient of the image is a human as opposed to a machine if the correct word is selected to annotate the distorted image.

7. The method of claim 6, wherein the image is distorted using one or more of the following:
    dithering, partitioning, quantization, noise addition, color re-mapping, and selective cut-and-resize.

8. The method of claim 6, wherein the plurality of images are separated by borders which are distorted or otherwise visually obfuscated.

9. The method of claim 6, wherein the words are generated to avoid ambiguity.

10. The method of claim 6, wherein the image is distorted using content-based image retrieval and annotation.

11. The method of claim 6, further including the steps of:
    selecting one of the images from the composite image by clicking in an area at or near the geometric center of one of the images in the composite image; and
    wherein the process is repeated if the clicking does not occur at or near the geometric center of one of the images.

12. A Completely Automated Public test to Tell Computers and Humans Apart (CAPTCHA) system, comprising:
    a database for storing annotated images, each image depicting a concept or object intended for human recognition;
    a processor for distorting the images;
    a display for presenting a distorted image to a user along with a separate list of annotations to choose from; and
    an input allowing a user to select the annotation that best corresponds to the distorted image.

13. The CAPTCHA system of claim 12, wherein the processor is operative to display a composite image containing a plurality of images.

14. The CAPTCHA system of claim 12, wherein the input allows a user to select one of the images from the composite image prior to annotation.

15. The CAPTCHA system of claim 12, wherein the processor is operative to:
    present a composite image including a plurality of different images separated by borders which are distorted or otherwise visually obfuscated.

* * * * *

UNITED STATES PATENT AND TRADEMARK OFFICE
CERTIFICATE OF CORRECTION

| | | |
|---|---|---|
| PATENT NO. | : 7,929,805 B2 | |
| APPLICATION NO. | : 11/668853 | |
| DATED | : April 19, 2011 | |
| INVENTOR(S) | : James Z. Wang et al. | |

It is certified that error appears in the above-identified patent and that said Letters Patent is hereby corrected as shown below:

Title page, Other Publications, line number 5, "Recognognizing Objects—CAPTCHA, Mori et al., IEEE, 1063-6919, 2003, pp. 1-8.*" should read --Recognizing Objects—CAPTCHA, Mori et al., IEEE, 1063-6919, 2003, pp. 1-8.*--.

Title page, page number 2, Other Publications, line number 1, "Recgonizing Objects—CAPTCHA, Mori et al, IEEE, 1063-6919/03, 2003, pp. 1-8.*" should read --Recognizing Objects—CAPTCHA, Mori et al, IEEE, 1063-6919/03, 2003, pp, 1-8.*--.

Column 1, line number 16, "Tights" should read --rights--.

Signed and Sealed this
Twenty-seventh Day of November, 2012

David J. Kappos
*Director of the United States Patent and Trademark Office*